United States Patent
Premoselli (10) Patent No.: US 11,692,591 B2
(45) Date of Patent: Jul. 4, 2023

(54) SEALING DEVICE FOR A BEARING UNIT

(71) Applicant: SKF METAL STAMPING S.R.L., Cocquio Trevisago (IT)

(72) Inventor: Fabrizio Premoselli, Cocquio Trevisago (IT)

(73) Assignee: SKF METAL STAMPING S.R.L.

( * ) Notice: Subject to any disclaimer, the term of this patent is extended or adjusted under 35 U.S.C. 154(b) by 0 days.

(21) Appl. No.: 17/482,649

(22) Filed: Sep. 23, 2021

(65) Prior Publication Data
US 2022/0106985 A1    Apr. 7, 2022

(30) Foreign Application Priority Data

Oct. 1, 2020   (IT) ................... 102020000023131
Oct. 1, 2020   (IT) ................... 102020000023134

(51) Int. Cl.
*F16C 33/78*     (2006.01)
*F16J 15/28*     (2006.01)

(52) U.S. Cl.
CPC ........ *F16C 33/7823* (2013.01); *F16C 33/783* (2013.01); *F16C 33/7886* (2013.01); *F16J 15/28* (2013.01)

(58) Field of Classification Search
CPC .............. F16C 33/7823; F16C 33/7879; F16C 33/7886; F16J 15/28
See application file for complete search history.

(56) References Cited

U.S. PATENT DOCUMENTS

| | | | | |
|---|---|---|---|---|
| 4,770,425 | A | * | 9/1988 | Colanzi ................ F16J 15/3264 277/402 |
| 2008/0166078 | A1 | | 7/2008 | Niebling et al. |
| 2017/0284471 | A1 | * | 10/2017 | Shibayama ......... F16C 33/7883 |
| 2021/0102579 | A1 | | 4/2021 | Barbera et al. |

FOREIGN PATENT DOCUMENTS

| | | |
|---|---|---|
| DE | 3814921 A1 * | 11/1988 |
| DE | 102020124608 | 4/2021 |
| EP | 1837563 | 9/2007 |
| EP | 2878842 | 6/2015 |
| EP | 3477137 | 5/2019 |
| EP | 3647632 | 5/2020 |
| JP | S4512494 | 6/1970 |

(Continued)

OTHER PUBLICATIONS

DE3814921_description.*

(Continued)

*Primary Examiner* — Phillip A Johnson
(74) *Attorney, Agent, or Firm* — Reed Smith LLP (57) ABSTRACT

A sealing device for a bearing unit, the device having a stationary part provided with: a first metal shield, an elastomer coating, co-molded on the first shield, at least one contacting lip, radially internal, belonging to the elastomer coating. The sealing device having a rotatable part provided with a second metal shield on which the contacting lip makes a sliding contact. The second metal shield is provided with a plurality of flow baffles positioned at least on an axially exposed surface of the shield, shaped as recesses realized through the axially exposed surface and distributed along a radially outer peripheral edge of the shield.

17 Claims, 6 Drawing Sheets

(56) References Cited

FOREIGN PATENT DOCUMENTS

| | | | |
|---|---|---|---|
| JP | 2005098417 | 4/2005 | |
| JP | 2013044420 A * | 3/2013 | .......... F16C 33/7883 |
| WO | 2010143694 | 12/2010 | |

OTHER PUBLICATIONS

Search Report for corresponding Italian Patent Application No. 102020000023131 dated Jun. 3, 2021.
Search Report for corresponding Italian Patent Application No. 102020000023134 dated Jun. 3, 2021.

* cited by examiner

SEALING DEVICE FOR A BEARING UNIT

CROSS-REFERENCE RELATED APPLICATIONS

This application is based on and claims priority to Italian Patent Application No. 102020000023132 filed on Oct. 1, 2020, and Italian Patent Application No. 102020000023134 filed on Oct. 1, 2020 under 35 U.S.C. § 119, the disclosures of which are incorporated by reference herein.

TECHNICAL FIELD

The present application relates to a sealing device for bearing units and to the bearing unit equipped with the same sealing device. The sealing device and the bearing unit are preferably, but not exclusively, applied to a wheel hub assembly.

The present application can be applied to all generations of wheel hub assemblies. In particular, such applications include both the case in which the outer ring of the bearings is rotatable, while the inner rings of the bearing are fixed, and the opposite case in which the inner rings rotate and the outer ring is fixed. The present application is also suitable for any type of rolling bodies (balls, rollers, tapered rollers, etc.).

BACKGROUND

Sealing devices according to the prior art are typically cassette seals in two pieces, comprising a rotatable portion mounted, for example, on the radially inner ring of the bearing unit and a stationary portion mounted, for example, on the radially outer ring of the bearing unit.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

The stationary portion of a sealing device comprises a metal shield mounted by interference on the radially outer ring and an elastomeric portion is co-molded on the metal shield. On the radially inner ring, rotatable, a second metal shield is instead mounted by interference.

The stationary portion in elastomeric material of the seal comprises one or more lips contacting the rotating portion and which ensure the seal towards the inside of the bearing unit itself.

Sealing means include a single piece, integral with one of the rings of the bearing unit, in which at least one contacting lip guarantees the seal thanks to the interference that is created when the seal is mounted with respect to one surface of the other bearing unit ring.

The design of a sealing device therefore includes one or more protrusions called lips which with different shapes and different orientations (typically axial and radial) are in contact with rotating surfaces of the bearing unit: in this way, the sealing device prevents the entry of contaminants from the outside, protecting the internal components of the bearing unit, i.e., the rolling bodies and the containment cages of the rolling bodies. Another important function of a sealing device is to prevent the leakage of lubricants available inside the bearing unit.

A sliding friction force is created between these contacting lips and the corresponding rotating contact surfaces of the bearing unit and, consequently, a dissipation of energy. In general, the sealing capacity increases with the number of contacting lips and their stiffness. At the same time, however, as these parameters increase, the extent of energy dissipation also increases.

Also, as a result of increasingly strong global competition, there is a constant demand from customers or vehicle manufacturers, for continuous technical/economic improvements relating to wheel hubs. In particular, with the evolution of technology, the demand for low energy dissipation components increases, while at the same time guaranteeing the same performance compared to premium solutions.

To solve this technical problem, on the one hand, the ideal situation would be a contactless sealing device, still able to prevent the entry of contaminants and the leakage of lubricants without dissipating energy. On the other end, a contactless sealing device does not work properly, especially in submerged environments.

There are further ways to reduce friction—the simplest is to reduce the number of contact lips compared to the standard design, but this usually means reducing the sealing capacity of the sealing unit.

Over time, manufacturers of sealing devices have reduced the number of contact lips in the design of the sealing device and have mitigated the reduction in sealing capacity by introducing one or more labyrinths. The function of the labyrinth is to make difficult the contaminants to reach the internal cavity of the sealing device and the edge of the contacting lip. However, these labyrinths are normally axial-symmetrical and have a very small dynamic function on the liquid contaminant, only due to the small adhesion that liquids have on the sealing device materials.

It is therefore necessary to define a sealing device that allows to reduce the energy dissipation without losing the sealing capacity, or, when necessary, to increase the sealing capacity without increasing the friction torque, in other words, the energy dissipation.

By way of non-limiting example, example embodiments will now be described with reference to a bearing unit 30, preferably a wheel hub assembly for motor vehicles provided with a bearing unit having a sealing device according to the example embodiments.

Figure 1:
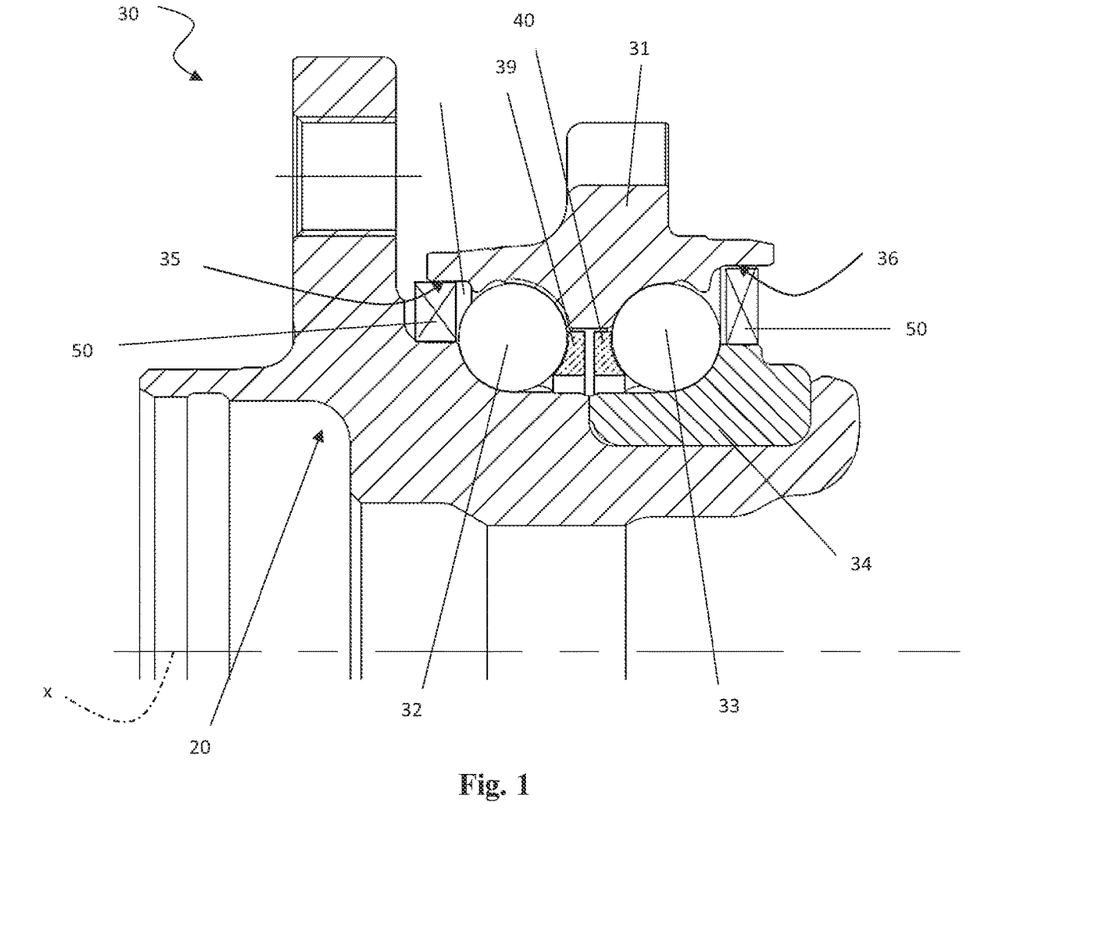
FIG. 1 is a cross section of a wheel hub assembly equipped with a bearing unit.

With reference to FIG. 1, a bearing unit or wheel hub assembly is indicated as a whole with 30. The unit has a central rotation X axis, and includes: a flanged radially inner ring 20, rotatable, a radially outer ring 31, stationary, a further radially inner ring 34, rotatable, mounted on, and integral with the flanged ring 20; at least one row of rolling bodies 32, 33, in this example spheres, interposed between the radially outer ring 31 and the flanged radially inner ring 20, two cages 39 and 40 to keep the rolling bodies of the rows of rolling bodies 32, 33 in position.

Throughout this description and in the claims, terms and expressions indicating positions and orientations such as "radial" and "axial" are understood to refer to the central rotation axis X of the bearing unit 30. Expressions such as "axially external" and "axially internal", on the other hand, refer to the mounted condition of the wheel hub assembly, and in this case, preferably, they refer to a wheel side and, respectively, to a side opposite the wheel side.

The flanged radially inner ring 20 and the radially outer ring 31 define, between them and at the opposite axial ends of the bearing unit 30, two gaps 35, 36 which, if not shielded, would allow entry into the bearing unit 30 itself of contaminants and impurities.

Therefore, in order to shield the bearing unit 30, at least one sealing device 50, made according to the dictates of the present disclosure, is mounted inside at least one of the two cavities 35, 36.

Normally the sealing devices 50 comprise two metal shields facing each other, at least one of which is provided with one or more sealing lips made of elastomeric material and in sliding contact with the other shield. The sealing device could alternatively comprise a metal shield only which is provided with one or more sealing lips, made of elastomeric material, which contact in a sliding manner a sliding surface of the bearing unit 30 in relative motion with respect to the sealing device.

Figure 2:
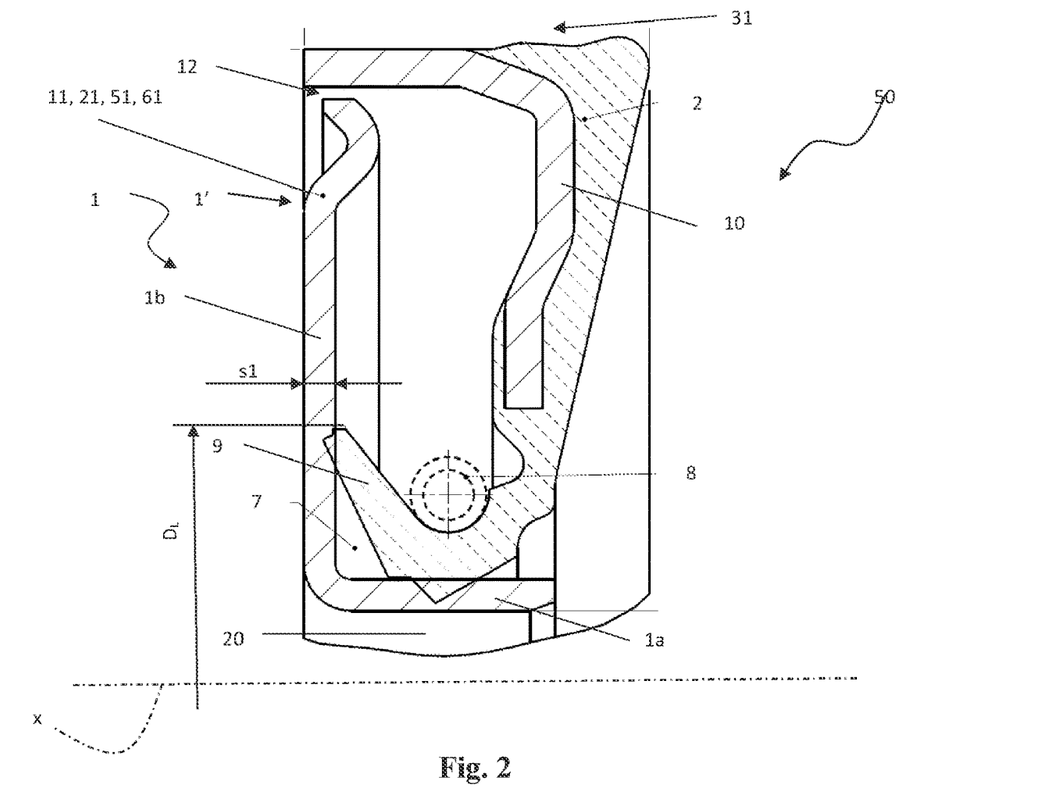
FIG. 2 is a detail of the wheel hub assembly in FIG. 1 in which there is a sealing device for the bearing unit, housed between the rings of the bearing unit.

In the following, with reference to FIG. 2, will be illustrated, purely by way of example, the case in which the sealing device 50 comprises a rotating part provided with a metal shield 1, mounted, for example, by interference on the flanged radially inner ring 20, and a stationary part, which in turn includes: a first metal shield 10 mounted, for example, by interference on the radially outer ring 31, an elastomeric coating 2, co-molded on the first metal shield 10, whose development is substantially radially internal and axially internal with respect to the same first metal shield 10, and at least one contacting lip 9 (preferably only one, as in FIG. 2), radially internal, belonging to the elastomeric coating 2 and therefore stationary, which makes a sliding contact on the second metal shield 1, rotatable. The contact is caused by an elastic element 8 and the inevitable energy dissipation by friction is mitigated by a lubricating grease present in the chamber 7 which forms between the lip 9 and the second metal shield 1.

The second metal shield comprises a cylindrical portion 1a and an annular portion 1b, provided with a radially outer peripheral edge 1'.

Figure 3:
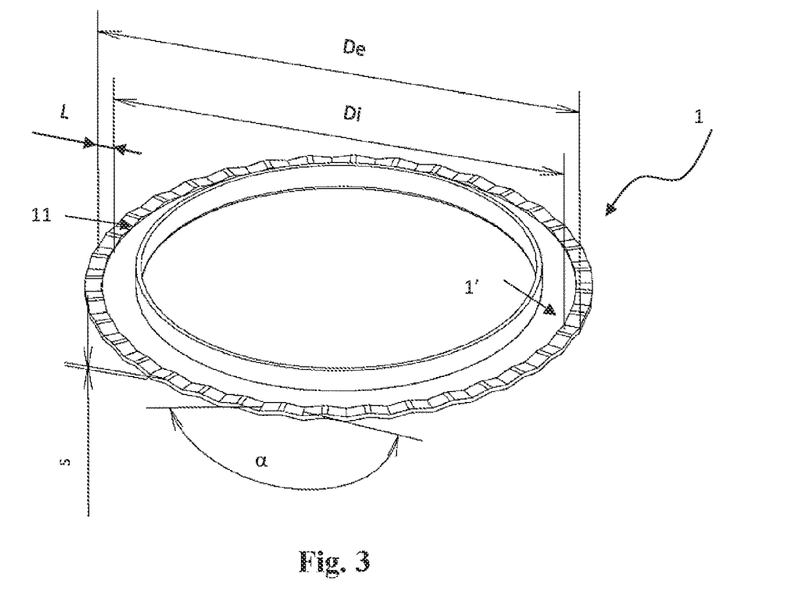
FIG. 3 is a three-dimensional view of a rotating shield provided with a plurality of axial flow baffles, according to a first embodiment of the present application.

With reference also to FIG. 3, according to a first embodiment of the present disclosure, the second metal shield 1 is provided with a plurality of flow baffles consisting of recesses 11 shaped in a "V" shape, radially external and along the axial direction, distributed along the radially outer peripheral edge 1' of the second metal shield 1 and obtained by plastic deformations of the outer peripheral edge 1' of the second metal shield 1 and which have a mainly axial effect.

In fact, during the operating conditions, in which the second shield 1 is set in rotation, as a result of this rotation the plurality of "V" shaped recesses 11, positioned near the small gap 12 between the stationary part and the rotating part of the sealing device 50, produce a helical effect. In this way the liquid contaminant which, during operation, tries to enter the internal cavity of the sealing device 50 through the same gap 12, is substantially removed in the axial direction.

The dimensioning of the recesses 11, obtained by plastic deformation, has been optimized, according to the applications, in order to obtain the maximum propellant effect. A widespread experimental test campaign led to the following conclusions:

said De the external diameter of the second metal shield 1 and Di the diameter above which the shield 1 is subjected to plastic deformation, the width L of the recesses 11 is obtained from the formula, $$L=(De-Di)/2$$

with the diameter Di greater than the outer limit of the working area of the lip 9, i.e., with the diameter Di greater than the diameter $D_L$ (FIG. 2) radially external at the distal end of the lip 9. A smaller width would penalize the propellant effect of the recesses 11, a larger width could interfere with the sealing lip, compromising its effectiveness;

the maximum thickness s of the "V" shaped recess 11 is preferably be less than or equal to twice the thickness s1 of the second metal shield 1 in its portion not subjected to plastic deformation, so as not to leave openings that allow the passage of the contaminant. A higher thickness would create slits that would allow the passage of the contaminant, while a lower thickness would penalize the propellant effect of the recesses 11;

finally, the angular width α of the "V" that forms the recesses 11 is preferably between 140° and 170°. Higher angular widths would penalize the benefit of the recesses 11, while lower angular widths would make the process of plastic deformation of the shield 1 technologically complex.

Figure 4:
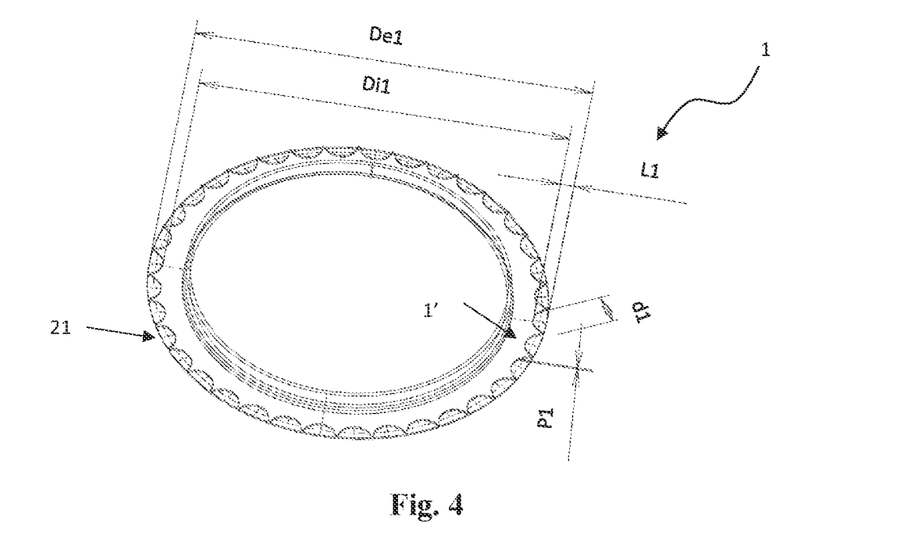
FIG. 4 is a three-dimensional view of a rotating shield provided with a plurality of radial flow baffles, according to a second embodiment of the present application.

With reference to FIG. 4, according to a second embodiment of the present disclosure, the second metal shield 1 is provided with a plurality of flow baffles consisting of substantially semicircular recesses 21, radially external and in the radial direction, distributed along the radially outer peripheral edge 1' of the second metal shield 1 and obtained by plastic deformations of the outer peripheral edge 1' of the second metal shield 1 and which have a mainly radial effect.

In fact, during the operating conditions, in which the second shield 1 is set in rotation, due to this rotation the plurality of semicircular recesses 21, positioned in proximity of the small gap 12 between the stationary part and the rotating part of the seal 50, create a helical effect. In this way the liquid contaminant which, during operation, tries to enter the internal cavity of the sealing device 50 through the same interspace 12, is substantially removed in an axial direction.

The dimensioning of the recesses 21, obtained by plastic deformation, has been optimized, according to the applications, in order to obtain the maximum propellant effect. A widespread experimental test campaign led to the following conclusions:

said De1 the external diameter of the second metal shield 1 and Di1 the diameter above which the shield 1 is subjected to plastic deformation, the width L1 of the recesses 21 is obtained from the formula, $$L1=(De1-Di1)/2$$

with the diameter Di1 greater than the outer limit of the working area of the lip 9, i.e., with the diameter Di greater than the diameter $D_L$ radially outer at the distal end of the lip 9. A smaller width would penalize the propellant effect of the grooves 11, a larger width could interfere with the sealing lip, compromising its effectiveness;

the depth p1 of the recess 21 is preferably be between 30% and 70% of the thickness s1 of the second metal shield 1 in its portion not subjected to plastic deformation. A depth of the recess 21 greater than 70% of the thickness s1 of the second shield 1 would excessively weaken the second metal shield, while a depth of less than 30% of the thickness s1 of the second shield 1 would penalize the beneficial effect of the recesses 21;

finally, the diameter d1 of the semicircle that defines the recesses 21 is preferably be obtained from the formula d1=De1−Di1 where, as already mentioned, De1 is the external diameter of the second metal shield 1 and Di1—the diameter above which the shield 1 is subjected to plastic deformation—is greater than the radially external diameter $D_L$ at the distal end of the lip 9. Lower values of the diameter d would penalize the benefit of the recesses 21, while higher values of the diameter d1 would excessively weaken the second shield 1. In other words, according to a preferred embodiment, the recess 11 is exactly a semicircle, thus resulting the diameter d of the semicircle equal to twice the width L1 of the recess.

Figure 5:
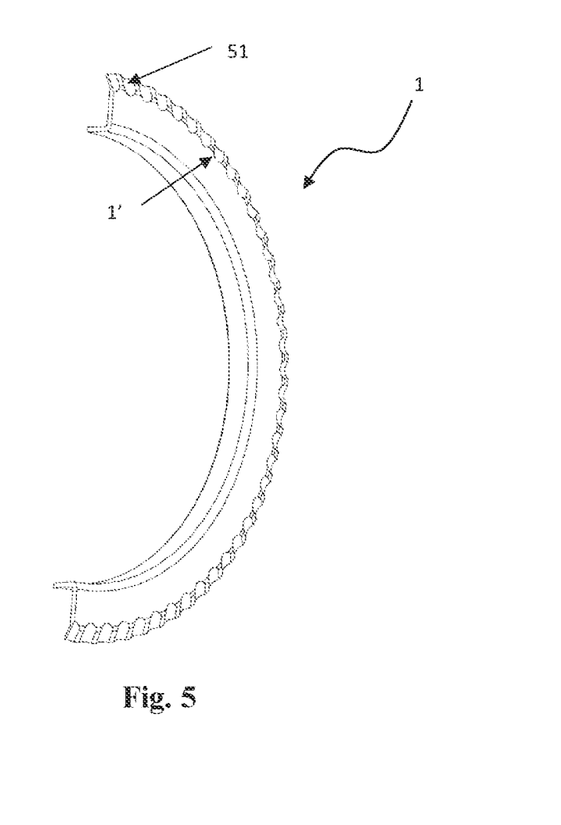
FIG. 5 is a three-dimensional view of a rotating shield provided with a plurality of slanting flow baffles, according to a third embodiment of the present application.
Figure 6:
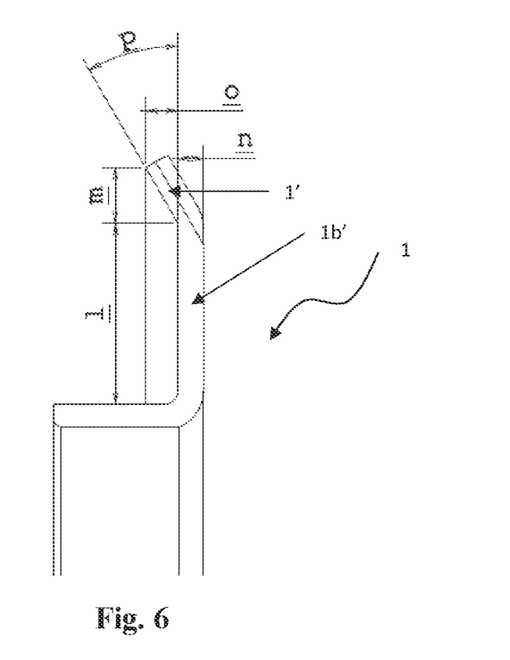
FIG. 6 is a first detail, in an enlarged scale, of the embodiment as in FIG. 5.
Figure 7:
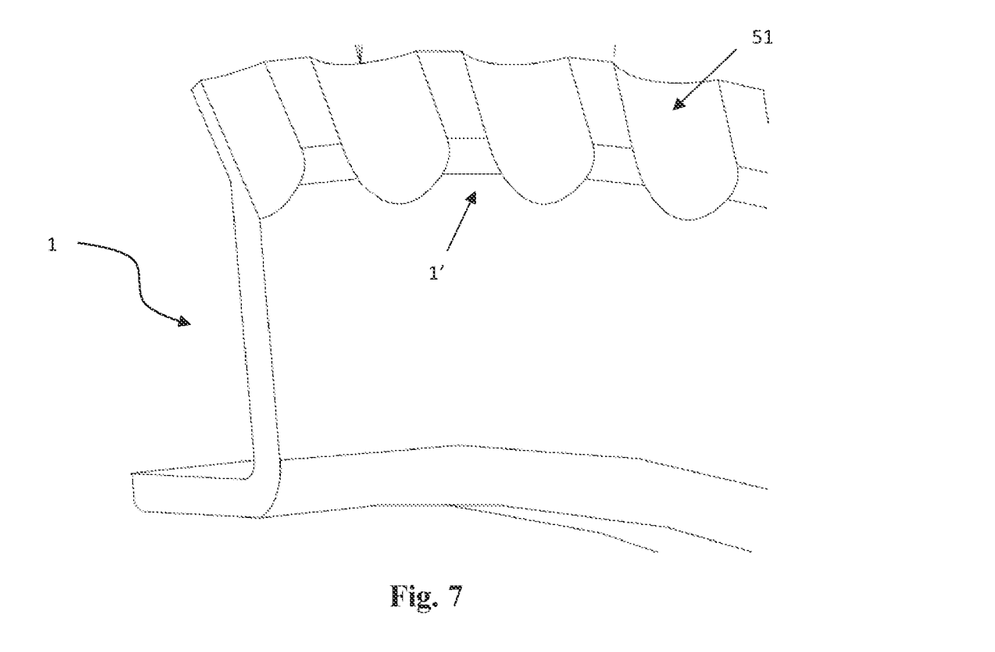
FIG. 7 is a second detail, in an enlarged scale, of the embodiment as in FIG. 5.

With reference to FIGS. 5-7, the second metal shield 1 is provided with a plurality of slanting flow baffles 51, according to a third embodiment of the present disclosure. According to this embodiment, the second metal shield 1 has a radially outer peripheral edge 1', which is inclined towards an axially internal direction, i.e., towards the elastomer coating 2. The plurality of flow baffles consists of substantially semielliptical slanting recesses 51, distributed along the radially outer peripheral edge 1' of the second metal shield 1 and obtained by plastic deformations of the radially outer peripheral edge 1' of the second metal shield 1, the recesses 51 having a radial-axial effect.

As for the previous embodiments, when rotating the plurality of semielliptical slanting recesses 51, positioned in proximity of the small gap 12 between the stationary part and the rotating part of the seal 50, create a helical effect. In this way the liquid contaminant which, during operation, tries to enter the internal cavity of the sealing device 50 through the same interspace 12, is substantially removed in an axial direction.

The dimensioning of the recesses 51, obtained by plastic deformation, has been optimized, according to the applications, in order to obtain the maximum propellant effect. A widespread experimental test campaign led to the following conclusions:

the length m of the radial projection of the radially outer peripheral edge should be smaller than or equal to the half-length 1 of the non-deformed portion 1b' of the annular portion 1b of the second metal shield 1. In other words:

$$m \leq l/2$$

A greater value of the length m would excessively weaken the second shield excessively weaken the second shield 1;

the length o of the axial projection of the radially outer peripheral edge should be greater than or equal to the thickness n of the annular portion 1b of the second metal shield 1. In other words:

$$o \geq n$$

Lower values of the length o would penalize the benefit of the recesses 51;

the value of the angle p, inclination of the radially outer peripheral edge 1 respect to a radial direction should be greater than 5°.

Figure 8:
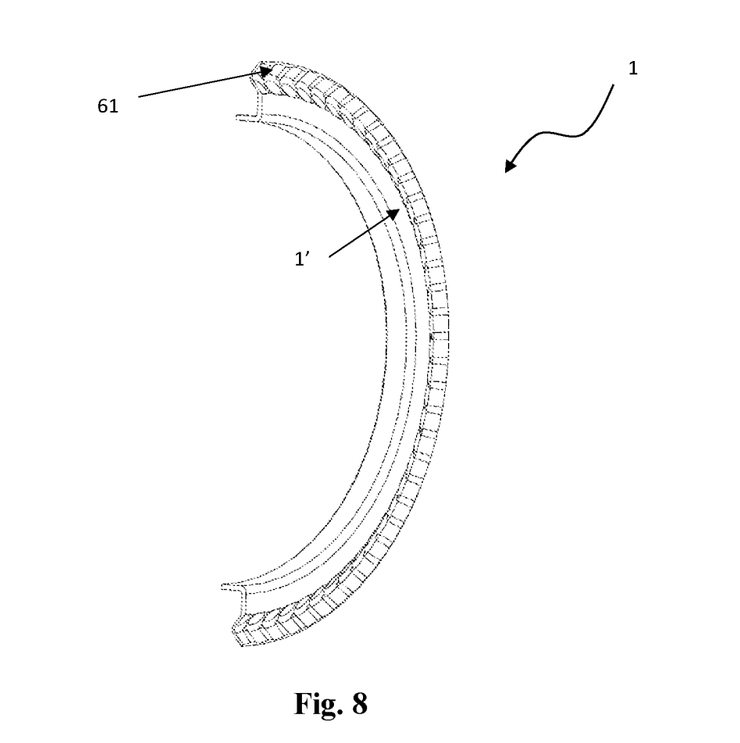
FIG. 8 is a three-dimensional view of a rotating shield provided with a plurality of slanting flow baffles, according to a fourth embodiment of the present application.
Figure 9:
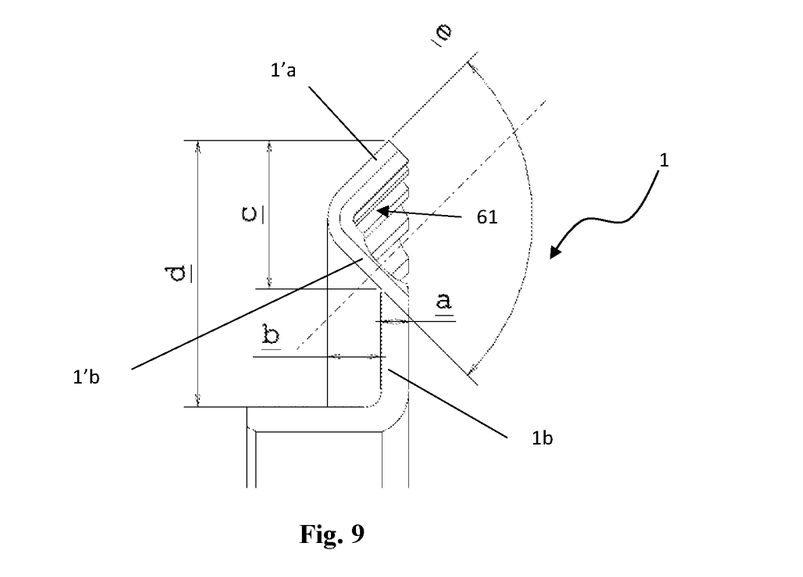
FIG. 9 is a first detail, in an enlarged scale, of the embodiment as in FIG. 8.
Figure 10:
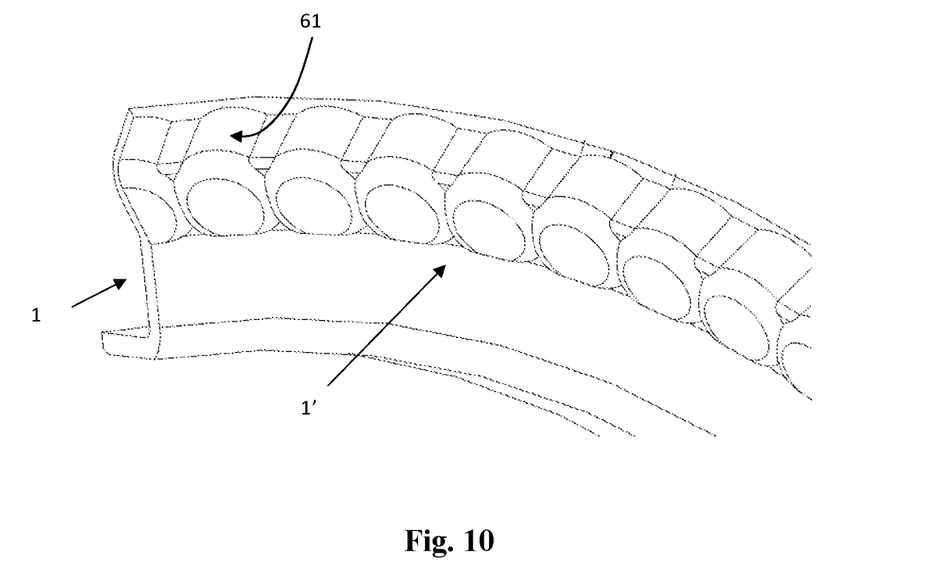
FIG. 10 is a second detail, in an enlarged scale, of the embodiment as in FIG. 8.

With reference to FIGS. 8-10, the second metal shield 1 is provided with a plurality of slanting flow baffles 61, according to a fourth embodiment of the present disclosure.

According to this embodiment, the annular portion 1b of the second metal shield 1 has a radially outer peripheral edge 1', which composed of a first portion 1'a inclined towards an axially internal direction, i.e., towards the elastomer coating 2, and a second portion 1'b, radially external respect to the first portion 1'a, inclined towards an axially external direction. The plurality of flow baffles consists of substantially semi-cylindrical slanting recesses 61, distributed along the second portion 1'b of the radially outer peripheral edge 1' of the second metal shield 1 and obtained by plastic deformations. The recesses 61 have a radial-axial effect.

As for the previous embodiments, when rotating the plurality of semi-cylindrical slanting recesses 61, positioned in proximity of the small gap 12 between the stationary part and the rotating part of the seal 50, create a helical effect. In this way the liquid contaminant which, during operation, tries to enter the internal cavity of the sealing device 50 through the same interspace 12, is substantially removed in an axial direction.

The dimensioning of the recesses 61, obtained by plastic deformation, has been optimized, according to the applications, in order to obtain the maximum propellant effect. A widespread experimental test campaign led to the following conclusions:

the length c of the radial projection of the radially outer peripheral edge 1' (i.e., the sum of the radial projections of the first portion 1'a and the second portion 1'b) should be smaller than or equal to the half-length d of the annular portion 1b of the second metal shield 1. In other words:

$$c \leq d/2$$

A greater value of the length c would excessively weaken the second shield excessively weaken the second shield 1;

the length b of the axial projection of the radially outer peripheral edge 1' should be greater than or equal to one and a half the thickness a of the annular portion 1b of the second metal shield 1. In other words:

$$b \geq 1,5 \times a$$

Lower values of the length b would penalize the benefit of the recesses 1;

the value of the angle e, between the first portion 1'a and the second portion 1'b of the radially outer peripheral edge 1' should be in the range 10°-170°.

Ultimately, the proposed solutions have the undoubted advantage of reducing the friction torque, i.e., the dissipation of energy, and maintaining the sealing capacity by applying the hydrodynamic characteristic—plurality of flow baffles—described above and reducing the number of contact lips, or by decreasing the pressure of the themselves, for example by using an elastic element that exerts a lower closing force or by using a more appropriate lip geometry. Alternatively, such solutions allow to increase the sealing capacity and keep the dissipated energy unchanged using the same hydrodynamic characteristic described above and keeping the number of contact lips unchanged. Furthermore, the flow baffles obtained from the deformation of the metal component allow to reduce costs by not having to add other elements to the sealing device.

Exemplary embodiments define a cassette sealing device provided with a rotatable metal shield with hydrodynamic characteristics. In particular, according to the disclosure, on the metal shield is realized a specific hydrodynamic characteristic, consisting in a plurality of flow baffles positioned at least on an axially exposed surface of the shield. These flow baffles are shaped as recesses realized through the axially exposed surface and (preferably, uniformly) distributed along a radially outer peripheral edge of the shield. The flow baffles are obtained by plastic deformations of the radially outer peripheral edge of the metal component.

By rotation of the rotating shield, the flow baffles, positioned near the small gap between the static part and the rotating part of the sealing device, act like a propeller, mainly moving away in the axial and/or in the radial direction the liquid contaminant that try to enter during operation into the internal cavity of the sealing device through the same gap.

Exemplary embodiments minimize the number of contacting lips and, consequently, the dissipation of energy due to friction or, alternatively, by keeping the number of contacting lips unchanged, to improve the sealing capacity of the device.

Exemplary embodiments a sealing device for a bearing unit having the characteristics set out in the independent claim, attached to the present description.

Exemplary embodiments relate to a bearing unit and, in particular, to a bearing unit for a wheel hub assembly provided with a sealing device according to any of the embodiments of the present disclosure.

In addition to the embodiment of the disclosure, as described above, it is to be understood that numerous other variants exist. It is also to be understood that such embodiments are exemplary only and limit neither the scope of the disclosure, nor its applications, nor its possible configurations. On the contrary, although the above description allows the skilled person to carry out the present disclosure at least according to an exemplary embodiment thereof, it must be understood that many variants of the components described are possible, without thereby departing from the scope of the disclosure, as defined in the attached claims, which are interpreted literally and/or according to their legal equivalents.

The invention claimed is:

1. A sealing device for a bearing unit, the device comprising:
a stationary part comprising:
a first metal shield,
an elastomer coating co-molded on the first metal shield,
at least one contacting lip, wherein the at least one contacting lip is radially internal of the first metal shield, wherein the elastomer coating comprises the at least one contacting lip; and
a rotatable part comprising:
a second metal shield on which the contacting lip makes a sliding contact,
wherein the second metal shield comprises a plurality of flow baffles positioned at least on an axially exposed surface of the second metal shield, wherein the plurality of flow baffles are shaped as recesses on the axially exposed surface of the second metal shield and distributed along a radially outer peripheral edge of the second metal shield;
wherein the flow baffles are uniformly distributed along the radially outer peripheral edge of the second metal shield and are configured as plastic deformations of the radially outer peripheral edge of the second metal shield.

2. The sealing device of claim 1, wherein the plurality of flow baffles comprises recesses, where each recess is shaped as a "V" in the axial direction.

3. The sealing device of claim 2, wherein
a width (L) of the plurality of flow baffles is defined by the formula $$L=(De-Di)/2$$

wherein De is the external diameter of the second metal shield and Di is the diameter above which the second metal shield is subjected to plastic deformation, and
the diameter (Di) is greater than a diameter ($D_L$) that is radially external of the contacting lip.

4. The sealing device of claim 2, wherein a maximum thickness (s) of the plurality of flow baffles is less than or equal to twice a thickness (s1) of the second metal shield in a portion of the second metal shield not subjected to plastic deformation.

5. The sealing device of claim 2, wherein an angular width (α) of the plurality of flow baffles, "V" shaped, is between 140° and 170°.

6. The sealing device of claim 1, wherein the plurality of flow baffles comprises semicircular shaped recesses in the radial direction.

7. The sealing device of claim 6, wherein
a width (L1) of the plurality of flow baffles is defined by the formula $$L1=(De1-Di1)/2$$

where De1 is the external diameter of the second metal shield and Di1 is the diameter above which the second metal shield is subjected to plastic deformation, and
the diameter (Di1) is greater than a diameter ($D_L$) that is radially external of the contacting lip.

8. The sealing device of claim 6, wherein a depth (s) of the plurality of flow baffles is between 30% and 70% of a thickness (s1) of the second metal screen in a portion of the second metal screen not subjected to plastic deformation.

9. The sealing device of claim 1, wherein the plurality of flow baffles comprises semielliptical slanting recesses distributed along a radially outer peripheral edge, wherein the radially outer peripheral edge is inclined according to an axially internal direction, towards the elastomer coating.

10. The sealing device of claim 9, wherein a length (m) of a radial projection of the radially outer peripheral edge is defined by the following formula:

$$m \leq l/2$$

where (l) is a length of a non-deformed portion (lb') of an annular portion (lb) of the second metal shield.

11. The sealing device of claim 9, wherein a length (o) of an axial projection of the radially outer peripheral edge is greater than or equal to a thickness (n) of the annular portion (lb) of the second metal shield.

12. The sealing device of claim 9, wherein a value of the angle (p), inclination of the radially outer peripheral edge respect to a radial direction, is greater than 5°.

13. The sealing device of claim 1, wherein
the radially outer peripheral edge is composed of a first portion inclined according to an axially internal direction, towards the elastomer coating, and a second portion (l'b), radially external with respect to the first portion (l'a) and inclined according to an axially external direction, and
the plurality of flow baffles comprises semi-cylindrical slanting recesses, distributed along the second portion (l'b) of the radially outer peripheral edge of the second metal shield.

14. The sealing device of claim 13, wherein a length (c) of a radial projection of the radially outer peripheral edge is defined by the following formula:

$$c \leq d/2$$

where (1) is a length of a non-deformed portion (lb') of an annular portion (lb) of the second metal shield.

15. The sealing device of claim 13, wherein a length (b) of an axial projection of the radially outer peripheral edge is defined by the following formula:

$$b \leq 1,5 \times a$$

where (a) is a thickness of the annular portion (lb) of the second metal shield.

16. The sealing device of claim 13, wherein a value of an angle (e) between the first portion (l'a) and the second portion (l'b) of the radially outer peripheral edge is in the range 10°-170°.

17. A bearing unit provided with the sealing device of claim 1 comprising:
- a flanged radially internal ring, wherein the flanged radially internal ring is rotatable,
- a flanged radially outer ring, wherein the flanged radially outer ring is stationary,
- an additional radially inner ring, wherein the additional radially inner ring is rotatable, mounted on and integral with the flanged radially inner ring,
- a plurality of rolling bodies interposed between the radially outer ring and the radially inner rings.

* * * * *